United States Patent [19]
Ito

[11] Patent Number: 5,966,261
[45] Date of Patent: Oct. 12, 1999

[54] MAGNETIC HEAD DRIVING CIRCUIT WITH MEMORY CIRCUIT

[75] Inventor: Hajime Ito, Kanagawa, Japan

[73] Assignee: Sony Corporation, Tokyo, Japan

[21] Appl. No.: 08/153,643

[22] Filed: Nov. 17, 1993

[30] Foreign Application Priority Data

Nov. 17, 1992 [JP] Japan ................................ 4-332513

[51] Int. Cl.⁶ ...................................................... G11B 5/00
[52] U.S. Cl. ............................... 360/65; 360/66; 360/67; 360/68
[58] Field of Search ................................ 360/62, 67, 68, 360/71, 78.07, 135, 31, 60, 69, 75, 65–66; 324/212; 395/425; 364/188; 29/783; 711/4, 105

[56] References Cited

U.S. PATENT DOCUMENTS

| 4,268,905 | 5/1981 | Johann et al. ..................... 360/31 X |
|---|---|---|
| 4,532,562 | 7/1985 | Powell ................................. 360/78.07 |
| 4,547,820 | 10/1985 | Saito ......................................... 360/71 |
| 4,570,217 | 2/1986 | Allen et al. ............................. 364/188 |
| 4,644,426 | 2/1987 | Saito ......................................... 360/71 |
| 4,802,050 | 1/1989 | Miyabayashi et al. ................. 360/135 |
| 4,979,055 | 12/1990 | Squires et al. ............................ 360/69 |
| 5,041,924 | 8/1991 | Blackborow et al. .................... 360/75 |
| 5,191,707 | 3/1993 | Sasamoto et al. ........................ 29/783 |
| 5,291,346 | 3/1994 | Baergaard ................................ 360/60 |
| 5,315,456 | 5/1994 | Hessing et al. ...................... 360/77.08 |

*Primary Examiner*—W. R. Young
*Attorney, Agent, or Firm*—Limbach & Limbach L.L.P.

[57] ABSTRACT

In a magnetic disk apparatus such as a floppy disk drive, the operating conditions can be readily and securely switched in a detailed manner using a simple construction. A magnetic head 20 is driven or a reproduced signal is converted into reproduction data by switching operating conditions in accordance with operating information stored in a memory circuit 30 where the operating information is set in the memory circuit 30 through external equipment.

16 Claims, 2 Drawing Sheets

MAGNETIC HEAD DRIVING CIRCUIT WITH MEMORY CIRCUIT

BACKGROUND OF THE INVENTION

1. Field of the Invention

The present invention relates to a magnetic disk apparatus and more particularly, is applicable to, for example, a floppy disk driving device.

2. Description of the Related Art

Conventionally, this type of floppy disk driving device is adapted to drive a magnetic head by a magnetic head driving circuit which is formed as an integrated circuit to be an integral part thereof and furthermore to process a reproduced signal output from the magnetic head. Since its usefulness is greatly improved if such a magnetic head driving circuit may be used in common by various types of equipment, this type of magnetic head driving circuit is adapted to be capable of switching its operating conditions by providing an external switching means.

In particular, the conventional magnetic head driving circuit is adapted to be capable of setting its recording current to two levels depending on whether a predetermined terminal is connected to a ground or not, the switching of such a connection being effected by replacing a jumper plug. Further, other characteristics, such as the cut-off frequency of a lowpass filter for limiting the bandwidth of reproduced signals and an emitting color of an light-emitting diode for indicating an operating condition can be likewise switched by replacing a jumper plug. Thereby the conventional magnetic head driving circuit is adapted to be capable of being used for various types of equipment as an entire circuit board having a magnetic driving circuit implemented thereon or as an entire floppy disk driving device by simply changing a jumper plug to be plugged in.

This type of floppy disk driving device is inclined to intensify a peak shift, as the recording current is increased, although an overwrite is securely effected. For this reason, it is desirable in this type of floppy disk driving device to set the recording current to an optimum value, while such optimum value is different for each magnetic head. In this regard, there is a method in which the peak shift is corrected by correcting the timing of recording data, where the optimum value of such correction amount itself, too, varies by each magnetic head according to the recording current. Further, an optimum value with respect to the cut-off frequency of the low-pass filter for limiting the bandwidth of a reproduced signal also varies by each magnetic head.

Accordingly, it is presumed that, if these operating conditions can be switched in a detailed manner, desired recording data may be recorded and reproduced accurately at a high density. In the conventional magnetic head driving circuit, however, if the operating conditions are minutely switched by replacing jumper plugs, then replacing the jumper plugs becomes correspondingly difficult and there is also a problem of erroneously setting the operating conditions. Further, if the operating conditions are to be minutely switched by replacing jumper plugs in this manner, wiring of the peripheral patterns of the jumper plugs becomes complicated, resulting in a problem that the circuit board is correspondingly increased in size.

Although a method in which the operating conditions are switched by changing positions of soldering instead of using jumper plugs has been considered, it is not yet satisfactory for practical use because of degradation in reliability associated with the changing of the soldering positions is possible.

SUMMARY OF THE INVENTION

In view of the foregoing, an object of this invention is to provide a magnetic disk unit of which operating conditions may be minutely switched in a simple and secure manner by means of a simple construction.

The foregoing object and other objects of the invention have been achieved by the provision of a magnetic disk unit 1 for recording or reproducing recording data to or from a predetermined disk-like recording medium by driving a magnetic head 20. The magnetic disk unit 1 includes a magnetic head driving circuit 29 for driving the magnetic head 20 in accordance with the recording data or a magnetic head driving circuit 29 for converting reproduced signal into reproduction data. The head driving circuit 29 drives the magnetic head 20 by switching operating conditions in accordance with operating information stored in a memory circuit 30 or converts the reproduced signal into the reproduction data by switching operating condition in accordance with the operating information stored in the memory circuit 30. The operating information may be set in the memory circuit 30 through predetermined external equipment 2.

Furthermore, in the present invention, the operating information may include a magnetic head driving current at the time of driving the magnetic head 20. The operating information may include correction data for correcting timing of recording data. The operating information may include data of cut-off frequency of a filter circuit for limiting bandwidth of the reproduced signal. The operating information may include operation switching data of input/output circuits 48A to 48F of the magnetic head driving circuit 29.

The magnetic head 20 is driven or the reproduced signal is converted into reproduction data by switching operating conditions in accordance with the operating information stored in the memory circuit 30, and, by setting the operating conditions in the memory circuit 30 through external equipment. The operating information may be set as required to switch the operating conditions in a detailed manner.

According to the present invention, the magnetic head is driven by switching the operating conditions in accordance with operating information stored in a memory circuit, or a reproduced signal is converted into a reproduction data by switching the operating conditions in accordance with operating information stored in the memory circuit. Then, the operating information is set in the memory circuit through external equipment. Thereby, it is possible to obtain a magnetic disk driving unit in which operating conditions may be switched in a detailed manner with a simple construction.

The nature, principle and utility of the invention will become more apparent from the following detailed description read in conjunction with the accompanying drawings in which like parts are designated by like reference numerals or characters.

DETAILED DESCRIPTION OF THE EMBODIMENT

Preferred embodiments of this invention will be described with reference to the accompanying drawings.

(1) Overall Construction

Figure 1:
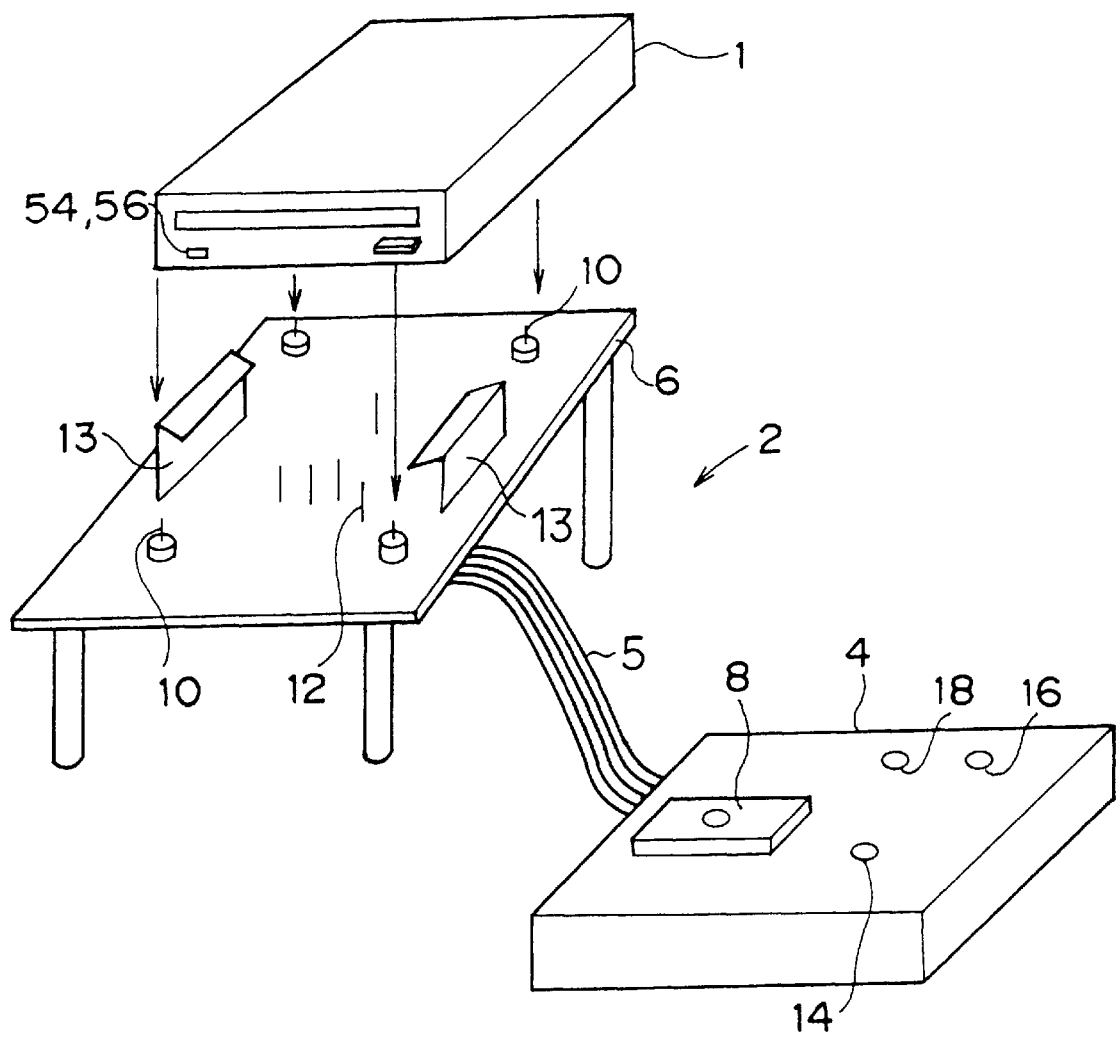
FIG. 1 is a perspective view showing a floppy disk drive according to an embodiment of the present invention.

Referring to FIG. 1, numeral 1 denotes a floppy disk driving unit in which operating conditions can be set by attaching it to an operating condition setting device 2. Specifically, in the operating condition setting device 2, an EPROM writing device 4 and a drive fixing device 6 are connected to each other through a cable 5. The EPROM writing device 4 is adapted to output to the drive fixing device 6 data of operating conditions (hereinafter referred to as operating information) stored in a master ROM 8 in the form of serial data.

In the drive fixing device 6, positioning pins 10 are embedded on the four corners thereof in a manner raised therefrom, so that connecting pins 12 are connected at predetermined positions to a circuit board of the floppy disk drive 1 by pressing the floppy disk driving unit 1 from the upper side thereof by using the pins 10 as a guide. Thereby, the connecting pins 12 are connected to the writing device 4.

It should be noted that, in the drive fixing device 6, plate-like retaining plates 13 the terminal end of which are bent to be capable of being folded inwardly, are provided on left and right sides thereof. This is so that the retaining plates 13 are bent and restored to their original state when the floppy disk driving unit 1 is pressed against them. Thereby the floppy disk driving unit 1 may be retained in a manner pressed against the drive fixing device 6 by means of the retaining plates 13.

The operating condition setting device 2 is thereby capable of recording the operating information stored in the master ROM 8 to a floppy disk driving unit 1, when the floppy disk driving unit 1 is pressed against the drive fixing device 6. When an operating element 14 for starting is pressed, the floppy disk driving unit 1 is operated under the operating conditions which are determined by such operating information.

Further, in the operating condition setting device 2, upon recording of the operating information to a floppy disk within the floppy disk driving unit 1 as described, the recording result is verified so that a light emitting diode 16 for indicating "OK" is lit when the operating information has been correctly recorded, while a light emitting diode 18 for indicating "NG" is lit when it has been unable to correctly record the operating information. Thereby, an operator can determine whether the operating conditions have been correctly set or not by checking the lit state of the light emitting diodes 16 and 18, whereby operability can be improved.

Further, the operator is able to minutely change the operating conditions by changing the master ROM 8 as required. In this way, identical floppy disk driving units 1 can be respectively adapted to various types of equipment and it is possible to set the most suitable operating conditions for each floppy disk driving unit 1.

(2) Floppy Disk Driving Unit

Figure 2:
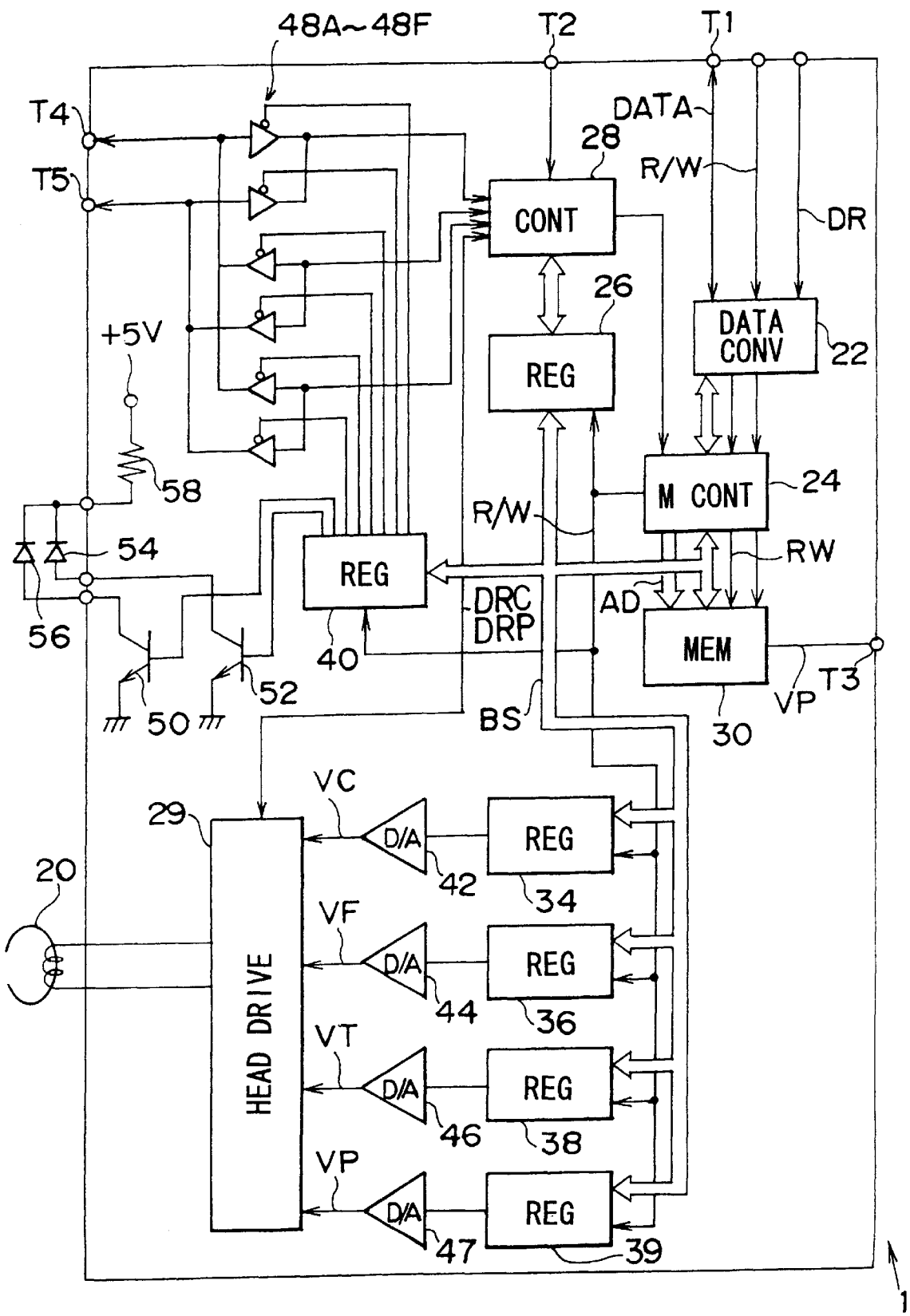
FIG. 2 is a block diagram showing the floppy disk drive.

As shown in FIG. 2, the floppy disk driving unit 1 is formed integrally on a predetermined circuit board so as to drive the magnetic head 20 to record or reproduce desired data. Specifically, in the floppy disk driving unit 1, a connector is disposed on the back side surface of the box-like body thereof so that it is possible to input to and output from desired external equipment recorded or reproduced data DATA, clock R/W for writing and reading, direction data DR, etc., through this connector.

Thereby, in the floppy disk driving unit 1, the recording data DATA input through the connector are read out in the form of a serial data to a data conversion circuit 22 where it is then converted into parallel data to be output to a memory control circuit 24. It is transferred to a register 26 from the memory control circuit 24 through a bus BS.

A control circuit 28 converts the recording data DATA stored in the register 26 into serial data and outputs it sequentially to the head driving circuit 29 at predetermined timings, where it is converted into a recording signal and is output to the magnetic head 20. Thereby, the floppy disk driving unit 1 is adapted to be capable of recording the recording data DATA in a sequential manner to a predetermined region of a floppy disk.

At the time of reproduction, on the other hand, the floppy disk driving unit 1 converts a reproduced signal into a reproduction data DRC at the head driving circuit 29 by binarizing the reproduced signal output from the magnetic head 20 and outputs the reproduction data to the control circuit 28. Here, after selectively taking in the reproduction data at predetermined timings, the control circuit 28 outputs the read data to the memory control circuit 24 through the register 26. Thereby, the floppy disk driving unit 1 obtains the regenerative data DRP picked up from a predetermined region of a floppy disk, and the reproduction data are output to external equipment in the form of serial data sequentially through the memory control circuit 24 and the data conversion circuit 22.

At the time of such recording or reproducing, the control circuit 28 is adapted to be capable of moving the magnetic head in the radial direction of the floppy disk by providing an actuator driving circuit with control data, thereby the floppy disk driving unit 1 can access a desired recording track.

(3) Storing of Operating Information

The floppy disk driving unit 1 is set onto the drive fixing device 6, whereby the connecting pins 12 are brought into contact with a predetermined land so that the operating information can be written thereto by driving the EPROM write device 4. That is, in the floppy disk driving unit 1, the connecting pins 12 are contacted with the specific land to change over the signal level of an operation mode setting terminal T2 of the control circuit 28, to thereby switch the operation mode thereof to the operating condition setting mode.

Further, when the floppy disk driving unit 1 in this state is set on the drive fixing device 6, the connecting pins 12 of the drive fixing device 6 are brought into contact with a recording data input terminal T1 of the data conversion circuit 22 so that it is connected to the EPROM writing device 4. Thereby, when the operating element 14 of the EPROM write device 4 is pressed to be operated, the operating information in the EPROM write device 4 can be input.

Specifically, when the operation mode is switched to the operating condition setting mode, the control circuit 28 switches the operation mode of the memory control circuit 24, thereby data of the operating information sequentially input through the data conversion circuit 22 on the basis of the clock R/W are output to the memory circuit 30 from the memory control circuit 24. Here, the memory circuit 30 is composed of a read only memory circuit data of which may be rewritten and, when it is set on the drive fixing device 6, the signal level of its programming terminal T3 is retained at "H" level. In response to this, the memory control circuit 24 generates address data AD on the basis of the clock R/W and outputs it to the memory circuit 30.

Thereby, the memory circuit 30 is adapted to sequentially store data of the operating information output from the memory control circuit 24. Thereby, in the floppy disk driving unit 1, the operating information stored in the master ROM 8 is stored to the memory circuit 30 so that the operating conditions can be set in a detailed manner by initializing the operating conditions at the time of starting in accordance with the operating information.

In response to this, when storage of the operating information is completed, verifying processing is executed at the memory control circuit 24, so that, in the floppy disk driving unit 1, it is possible to determine whether the operating information has been correctly stored or not.

In this embodiment, data of the operating information is changed for each magnetic head 20 in accordance with characteristic data of the magnetic head 20. This characteristic data is previously measured in the manufacturing process. Thereby, optimal operating conditions can be set according to each magnetic head 20 in the floppy disk driving unit 1, so that desired data can be recorded or reproduced securely and at high density. Further, in addition to the characteristics of the magnetic head 20, data of the operating information can be switched according to the specifications of the floppy disk driving unit 1. Thereby, specifications of identical floppy disk driving units 1 can be minutely changed so that they can be respectively adapted to various types of external equipment.

In this manner, that is, by minutely changing the specifications of driving units of an identical construction so that they can be adapted to various types of equipment, the manufacturing process can be correspondingly facilitated and labor for product management, etc. may be reduced.

(4) Setting of Operating Conditions

In the floppy disk driving unit 1, the operating conditions are set in the manner as described, by transferring the operating information stored in the memory circuit 30 to a predetermined register circuit at the time of starting. Specifically, when power is introduced and the logic level of the direction data DR is set to the logic level of reading, the memory control circuit 24 sequentially reads and outputs data of the operating information stored in the memory circuit 30.

At this time, at the memory control circuit 24, address data AD are sequentially generated in order of storage in synchronization with the clock R/W to access the memory circuit 30, so that data of the operating information is output to the bus BS in order of its storage. Further, the memory control circuit 24 switches operation of respective register circuits 34 to 40 at predetermined timings in synchronization with the address data, to thereby store data of the operating information into the corresponding registers 34 to 40. Here, each of the register circuits 34 to 40 is composed of an 8-bit register circuit, and the register circuit 34 is adapted to store data of recording current included in the operating information data. Thereby, the floppy disk driving unit 1 is adapted to be capable of switching the recording current to 256 levels corresponding to eight bits, so that the operating conditions can be set in a detailed manner.

For instance, the register circuit 34 outputs data of the recording current to a digital-analog conversion circuit 42, so as to provide an output signal VC of the digital-analog conversion circuit 42 to the head driving circuit 29. The head driving circuit 29 switches the recording current in accordance with the signal level of the output signal VC, thereby the floppy disk driving unit 1 can set the recording current to an optimal value according to the magnetic head 20.

On the other hand, the register circuit 36 is adapted to store data for correcting timing included in the operating information data, and provides the head driving circuit 29 with the timing correction data through the digital-analog conversion circuit 44. Here, the head driving circuit 29 is adapted such that, when converting the recording data into a recording signal, it corrects the timing of the recording signal in accordance with the signal level of an output signal VF of the digital-analog conversion circuit 44. Thereby, peak shift in reproducing is previously corrected at the time of recording. Thereby, the floppy disk driving unit 1 is adapted to be capable of switching the correction amount to 256 levels, corresponding to eight bits, so that it is possible to minutely set the operating conditions by varying the correction amount for each magnetic head 20.

On the other hand, the register circuit 38 is adapted to store data of the cut-off frequency to the head driving circuit 29 through a digital-analog conversion circuit 46. Here, the head driving circuit 29 is adapted to switch the cut-off frequency of a low-pass filter for limiting the bandwidth of the reproduced signal in accordance with the signal level of an output signal VT of the digital-analog conversion circuit 46. Thereby, the floppy disk driving unit 1 is adapted to be capable of effecting switching in a detailed manner with respect to the cut-off frequency, so that it can set the operating conditions in a detailed manner by switching such correction value for each magnetic head 20.

The register circuit 39 is adapted to store data of the peak shift correction value included in the operating information data and it provides such data to the head driving circuit 29 through a digital-analog conversion circuit 47. Here, the head driving circuit 29 is adapted such that, when the reproduced signal is to be output by means of binarization, it switches the correction amount of peak shift in accordance with the signal level of an output signal VP of the digital-analog conversion circuit 47. Thereby, the floppy disk driving unit 1 is adapted to be capable of minutely switching the correction amount also with respect to peak shift correction in reproducing, and it can set the operating conditions in a detailed manner by switching such correction amount for each magnetic head 20.

On the other hand, in the register circuit 40, data of the input/output circuits and the light emitting diodes included in the operating information data are stored. Here, the floppy disk driving unit 1 may be connected to external equipment by connecting a cable having a plurality of cores to a connector, where connection of the connector with these cores is to be switched in accordance with the specification of the floppy disk driving unit 1. Thereby, with the floppy disk driving unit 1, it is possible to use the same drive by changing its specification so that it corresponds to the equipment which is to be externally connected thereto.

Specifically, the register circuit 40 outputs to buffer circuits 48A to 48F data of the six significant bits in an 8-bit data which is taken in through the bus BS. Here, the buffer circuits 48A to 48F are formed by first and second terminals T4 and T5 to be connected to an external equipment and a tri-state buffer circuit which provides three input terminals of the control circuit 28 with connection thereof, so that operation is switched in accordance with the logic level of each bit output from the register circuit 40.

Thereby, connection of the connector of the floppy disk driving unit 1 is switched in accordance with the external equipment, so that the operating conditions can be set in a detailed manner with respect to the input/output circuits of the floppy disk driving unit 1.

Further, the register circuit 40 outputs to transistors 50 and 52 data of the two least significant bits of the 8-bit data taken in through the bus BS. Here, the transistors 50 and 52 are connected to a collector resistance 58 through orange and green light-emitting diodes 54 and 56 which are formed in an integrated manner, and the light-emitting diodes 54 and 56 are to be provided on the front surface of the floppy disk driving unit 1 (FIG. 1).

Thereby, the floppy disk driving unit 1 is capable of confirming the state of its operation by lighting the orange or green light emitting diode 54 or 56 in accordance with its specification, so as to be capable of minutely setting the operating conditions also with respect to the operation of the light-emitting diodes, as well as to the input/output circuits.

(5) Advantage of the Embodiment

According to the above embodiment, operating conditions such as the recording current and the cut-off frequency of a filter circuit are changed in accordance with the operating information stored in the memory circuit, thereby the operating conditions can be readily and securely changed in a detailed manner using a simple construction, so that the operating conditions can be set to an optimal value for each magnetic head and the operating conditions can be switched in accordance with desired specifications.

(6) Other Embodiments

It should be noted that, while, in the above described embodiment, the description has been given with respect to a case where the recording current, etc. are switched in accordance with the operating information, the present invention is not limited to this and it may be widely applied to cases where various other kinds of operating conditions are to be set. Further, while, in the above described embodiment, the description has been given with respect to a case where the present invention is applied to a floppy disk driving unit, the present invention is not limited to this and it may be widely applied, for instance to devices such as a hard disk unit.

While the invention has been described in connection with the preferred embodiments, it will be obvious to those skilled in the art that various changes and modifications may be made, without departing from the true spirit and scope of the invention as set forth in the appended claims.

What is claimed is:

1. A magnetic disk apparatus for driving a magnetic head to record or reproduce predetermined recording data on a disk-like recording medium, the magnetic disk apparatus comprising:

a magnetic head driving circuit for recording a recording signal of the predetermined recording data on the recording medium through a magnetic head, or converting a reproduced signal of the predetermined recording data which is reproduced from the recording medium through the magnetic head into reproduction data; and a memory circuit for storing operating information; wherein:

the memory circuit provides the magnetic head driving circuit with a recording condition, corresponding to the manner in which a recording signal is changed into a magnetic head output signal by the magnetic head, which is changed in accordance with the operating information stored in the memory circuit or with a converting condition, corresponding to the manner in which a reproduced signal is changed into reproduction data by the magnetic head, which is changed in accordance with the operating information stored in the memory circuit; and means for providing the memory circuit with the operating information from predetermined external equipment, which is external to the magnetic disk apparatus.

2. A magnetic disk apparatus according to claim 1, comprising:

a disk unit which includes the magnetic head driving circuit and the memory circuit; and an operating condition setting means for providing the disk unit with the operating information to be stored in the memory circuit.

3. A magnetic disk apparatus according to claim 2, wherein:

the operating condition setting means comprises a fixing means for being connected to the disk unit, a writing device for writing the operating information through the fixing means to the disk unit, and a master memory for storing the operating information.

4. A magnetic disk apparatus according to claim 3, wherein the master memory is a read only memory which is changeably mounted on the writing device.

5. A magnetic disk apparatus according to claim 3, wherein the fixing means has connecting pins which are detachably connectable to a circuit board of the disk unit.

6. A magnetic disk apparatus according to claim 2, wherein the disk unit further includes:

a data conversion circuit which receives the operating information from the operating condition setting means; and a memory control circuit which receives the operating information from the data conversion circuit and outputs the operating information to the memory circuit.

7. A magnetic disk apparatus according to claim 1, wherein the disk-like recording medium is a floppy disk.

8. A magnetic disk apparatus according to claim 1, further comprising:

a memory controller which sequentially reads the operating information from the memory circuit;

a register circuit which receives and stores the operating information from the memory controller and provides the operating information to the magnetic head driving circuit.

9. A magnetic disk apparatus according to claim 8, wherein the memory controller reads the operating information when power is introduced to the magnetic disk apparatus and a logic level of direction data corresponds to a predetermined level.

10. A magnetic disk apparatus according to claim 8, further comprising:

a digital-analog conversion circuit for performing a digital-analog conversion of the operating information which is provided from the register circuit to the magnetic head driving circuit.

11. A magnetic disk apparatus for driving a magnetic head to record predetermined recording data to a disk-like recording medium, the magnetic disk apparatus comprising:

a magnetic head driving circuit for recording a recording signal of the predetermined recording data to the recording medium through a magnetic head; and a memory circuit including an electronic memory for electronically storing operating information; wherein:

the memory circuit provides the magnetic head driving circuit with a recording condition, corresponding to the manner in which a recording signal is changed into a magnetic head output signal by the magnetic head, which is changed in accordance with the operating information stored in the memory circuit; and the memory circuit is provided with the operating information from predetermined external equipment which is external to the magnetic disk apparatus.

12. A magnetic disk apparatus for driving a magnetic head to reproduce predetermined recording data from a disk-like recording medium, the magnetic disk apparatus comprising:

a magnetic head driving circuit for converting a reproduced signal of the predetermined recording data which is reproduced from the recording medium through a magnetic head into reproduction data; and a memory circuit including an electronic memory for electronically storing operating information; wherein:

the memory circuit provides the magnetic head driving circuit with a converting condition, corresponding to the manner in which a reproduced signal is changed into reproduction data by the magnetic head, which is changed in accordance with the operating information stored in the memory circuit; and the memory circuit is provided with the operating information from predetermined external equipment which is external to the magnetic disk apparatus.

13. A magnetic disk apparatus for driving a magnetic head to record or reproduce predetermined recording data on a disk-like recording medium, the magnetic disk apparatus comprising:

a magnetic head driving circuit for recording a recording signal of the predetermined recording data on the recording medium through the magnetic head, or converting a reproduced signal of the predetermined recording data which is reproduced from the recording medium through the magnetic head into reproduction data;

a memory circuit for storing operating information; and means for providing the memory circuit with the operating information from predetermined external equipment, which is external to the magnetic disk apparatus, wherein the memory circuit provides the magnetic head driving circuit with a recording condition which is changed in accordance with the operating information stored in the memory circuit or with a converting condition which is changed in accordance with the operating information stored in the memory circuit; and wherein the operating information comprises magnetic head driving current data for driving the magnetic head.

14. A magnetic disk apparatus for driving a magnetic head to record or reproduce predetermined recording data on a disk-like recording medium, the magnetic disk apparatus comprising:

a magnetic head driving circuit for recording a recording signal of the predetermined recording data on the recording medium through the magnetic head, or converting a reproduced signal of the predetermined recording data which is reproduced from the recording medium through the magnetic head into reproduction data; and a memory circuit for storing operating information; and means for providing the memory circuit with the operating information from predetermined external equipment, which is external to the magnetic disk apparatus, wherein the memory circuit provides the magnetic head driving circuit with a recording condition which is changed in accordance with the operating information stored in the memory circuit or with a converting condition which is changed in accordance with the operating information stored in the memory circuit; and wherein the operating information comprises correction data for correcting timing of the recording data.

15. A magnetic disk apparatus for driving a magnetic head to record or reproduce predetermined recording data on a disk-like recording medium, the magnetic disk apparatus comprising:

a magnetic head driving circuit for recording a recording signal of the predetermined recording data on the recording medium through the magnetic head, or converting a reproduced signal of the predetermined recording data which is reproduced from the recording medium through the magnetic head into reproduction data; and a memory circuit for storing operating information; and means for providing the memory circuit with the operating information from predetermined external equipment, which is external to the magnetic disk apparatus, wherein the memory circuit provides the magnetic head driving circuit with a recording condition which is changed in accordance with the operating information stored in the memory circuit or with a converting condition which is changed in accordance with the operating information stored in the memory circuit; and wherein the operating information comprises cut-off frequency data of a filter circuit for limiting the bandwidth of the reproduced signal.

16. A magnetic disk apparatus for driving a magnetic head to record or reproduce predetermined recording data on a disk-like recording medium, the magnetic disk apparatus comprising:

a magnetic head driving circuit for recording a recording signal of the predetermined recording data on the recording medium through the magnetic head, or converting a reproduced signal of the predetermined recording data which is reproduced from the recording medium through the magnetic head into reproduction data; and a memory circuit for storing operating information;

wherein the memory circuit provides the magnetic head driving circuit with a recording condition which is changed in accordance with the operating information stored in the memory circuit or with a converting condition which is changed in accordance with the operating information stored in the memory circuit;

wherein the memory circuit is provided with the operating information from predetermined external equipment; and wherein the magnetic head driving circuit comprises an input and output circuit, and the operating information comprises operation switching data of the input and output circuit.

* * * * *